United States Patent [19]

Saito

[11] Patent Number: 4,956,058

[45] Date of Patent: Sep. 11, 1990

[54] SCROLL TYPE FLUID DISPLACEMENT APPARATUS WITH SURFACE TREATED SPIRAL ELEMENT

[75] Inventor: Fumiyoshi Saito, Isesaki, Japan

[73] Assignee: Sanden Corporation, Gunma, Japan

[21] Appl. No.: 588,564

[22] Filed: Mar. 12, 1984

[30] Foreign Application Priority Data

Mar. 15, 1983 [JP] Japan .............................. 58-36340[U]

[51] Int. Cl.[5] .......................... B05D 3/10; B23H 5/04; B23H 9/00

[52] U.S. Cl. .................................. 204/129.35; 427/309

[58] Field of Search .................. 418/55, 178; 427/307, 427/309; 204/33, 127.1, 129.35

[56] References Cited

U.S. PATENT DOCUMENTS

| | | | |
|---|---|---|---|
| 801,182 | 10/1905 | Creux | 418/55 A |
| 994,391 | 6/1911 | Hauer | 418/179 |
| 2,209,712 | 7/1940 | Brennan | 204/33 X |
| 2,519,588 | 8/1950 | McCulloch | 418/179 |
| 2,958,610 | 11/1960 | Ramirez et al. | 427/309 X |
| 3,155,311 | 11/1964 | Jones | 418/178 |
| 3,195,470 | 7/1965 | Smith | 418/56 |
| 3,313,239 | 4/1967 | Brunson et al. | 418/178 |
| 3,361,074 | 1/1968 | Eckerle | 418/179 |
| 3,552,895 | 1/1971 | Bayley | 418/178 |
| 3,600,114 | 8/1971 | Dvorak et al. | 418/56 |
| 3,756,754 | 9/1973 | Sakamaki | 418/179 |
| 3,887,310 | 6/1975 | Gerber | 418/178 |
| 3,888,746 | 6/1975 | Uy et al. | 418/178 |
| 3,986,799 | 10/1976 | McCullough | 418/55 A |
| 3,994,635 | 11/1976 | McCullough | 418/55 C |
| 3,994,636 | 11/1976 | McCullough | 418/55 C |
| 4,047,855 | 9/1977 | Goloff et al. | 418/178 |
| 4,097,342 | 6/1978 | Cooke et al. | 204/33 X |
| 4,348,463 | 9/1982 | Ohno et al. | 428/432 X |

FOREIGN PATENT DOCUMENTS

| | | | |
|---|---|---|---|
| 12615 | 6/1980 | European Pat. Off. . | |
| 55-35155 | 3/1980 | Japan . | |
| 57-99202 | 6/1982 | Japan | 418/55 |
| 57-148085 | 9/1982 | Japan | 418/55 |
| 58-51289 | 3/1983 | Japan | 418/55 |

*Primary Examiner*—John J. Vrablik

*Attorney, Agent, or Firm*—Banner, Birch, McKie & Beckett

[57] ABSTRACT

A scroll type fluid displacement apparatus is disclosed in which the scrolls are made of aluminum or an aluminum alloy to reduce the weight of the apparatus. The scrolls are finished by end milling and then electrolytically or chemically polished to reduce the roughness of the mating surfaces. Thereafter, at least one scroll is treated with alumite to reduce wearing due to contact between the scrolls. As a result, sealing of the fluid pockets between the scrolls during extended use of the apparatus can be maintained.

2 Claims, 2 Drawing Sheets

SCROLL TYPE FLUID DISPLACEMENT APPARATUS WITH SURFACE TREATED SPIRAL ELEMENT

BACKGROUND OF THE INVENTION

This invention relates to a fluid displacement apparatus, and more particularly, to improved scrolls for a scroll type fluid displacement apparatus.

Scroll type fluid displacement apparatus are well known in the prior art. For example, U.S. Pat. No. 801,182 to Cruex discloses the basic construction of a scroll type apparatus. The scroll type apparatus includes two scroll members each having a circular end plate and spiroidal or involute spiral element. These scroll members are maintained at an angular and radial offset so that the spiral elements interfit to make a plurality of line contacts between their spiral curved surfaces to thereby seal off and define at least one pair of fluid pockets. The relative orbital motion of the two scroll members shifts the line contacts along the spiral curved surfaces and, therefore, the fluid pockets change in volume. Since the volume of the fluid pockets increases or decreases, depending on the direction of the orbital motion, the scroll type fluid apparatus is applicable to compress, expand or pump fluids.

In comparison with conventional compressors of the piston type, a scroll type fluid displacement apparatus has some advantages such as fewer parts, continuous compression of fluid and others. However, there have been several problems with such scroll type fluid displacement apparatus, including ineffective sealing of the fluid pockets and wearing of the scroll members.

Generally, in scroll type fluid displacement apparatus, the scroll members are formed of aluminum or an aluminum alloy to reduce the weight of the apparatus. The surface of the spiral element of the orbiting scroll member also can be treated with alumite because, if the contact surface between the spiral elements grounds the aluminum, abnormal wear or mechanical loss is caused by the cohesive force between the aluminum surfaces. An oxidizing film of aluminum on the orbiting scroll reduces the cohesive force and provides a smoother operation. However, because the surfaces of the scroll members usually are finished by end milling, the aluminum surface is rough. Even if the rough surface of one or both of these scroll members is treated with alumite, the rough alumite treated surface is in contact with the aluminum surface of the other spiral element which causes abnormal wear of the spiral elements.

SUMMARY OF THE INVENTION

It is a primary object of this invention to provide an improved scroll type fluid displacement apparatus which provides excellent sealing and anti-wearing.

It is another object of this invention to provide a scroll type fluid displacement apparatus in which increased dimensional accuracy in manufacturing the scrolls can be achieved.

It is still another object of this invention to provide a scroll type fluid displacement apparatus in which friction between the spiral elements is reduced.

It is still another object of this invention to provide a scroll type fluid displacement apparatus which is simple in construction and light in weight to achieve the above described objects.

A scroll type fluid displacement apparatus according to this invention includes a pair of scrolls each comprising a circular end plate and a spiral wrap extending from one side of the circular end plate. The spiral elements interfit at an angular and radial offset to make a plurality of line contacts to define at least one pair of sealed off fluid pockets. A driving mechanism is operatively connected to one of the scrolls to effect the orbital motion of one scroll while simultaneously preventing rotation. As a result, the volume of the fluid pockets changes due to the orbital motion of the one scroll. Both scrolls are formed of aluminum or an aluminum alloy, and at least the orbiting scroll, is treated by alumite, but only after its surface is finished by electrolytic polishing or chemical polishing.

Further objects, features and other aspects of this invention will be understood from the detailed description of the preferred embodiments of this invention referring to the annexed drawings.

DETAILED DESCRIPTION OF THE PREFERRED EMBODIMENTS

Figure 1:
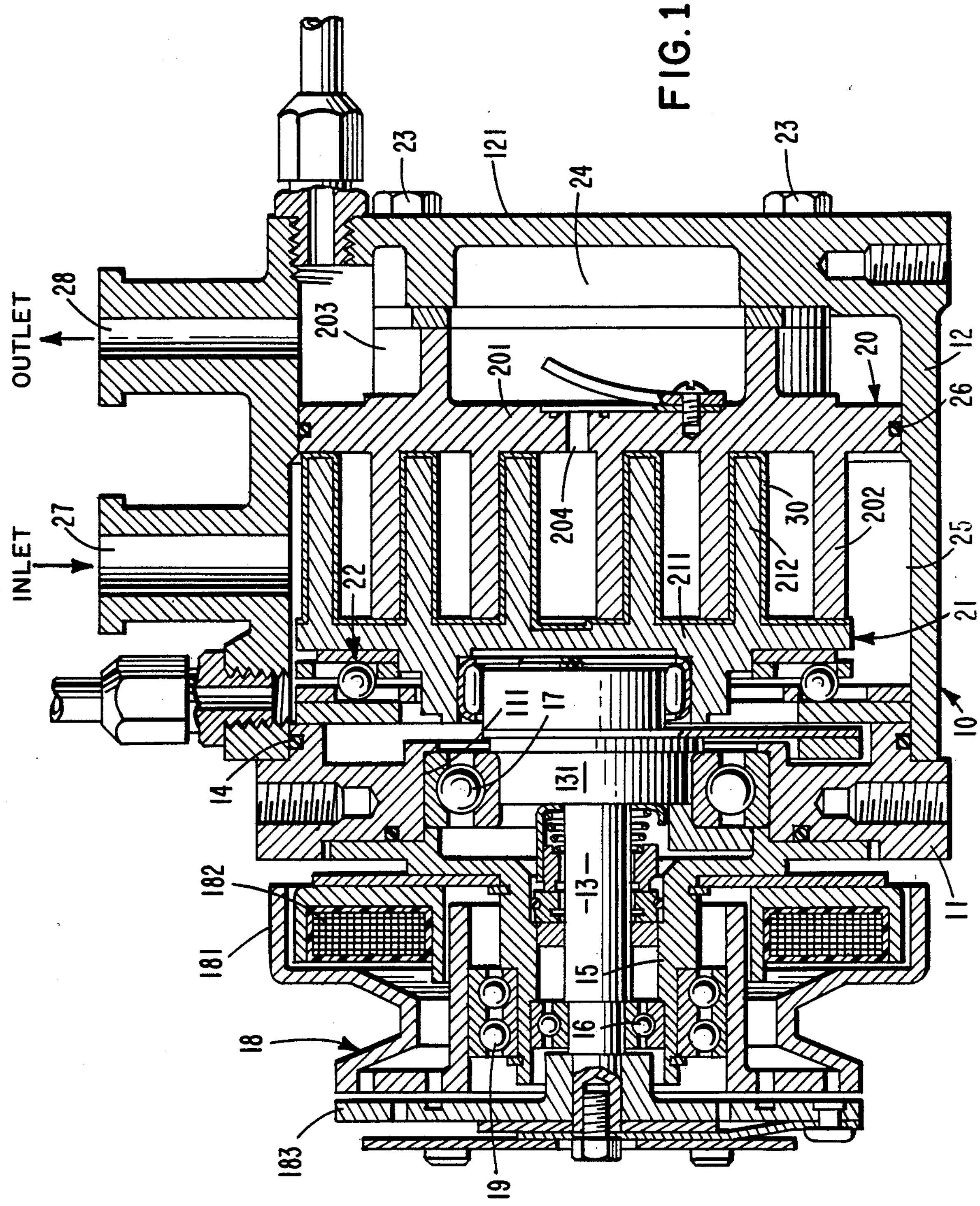
FIG. 1 is a vertical sectional view of a scroll type compressor according to one embodiment of this invention.
Figure 2:
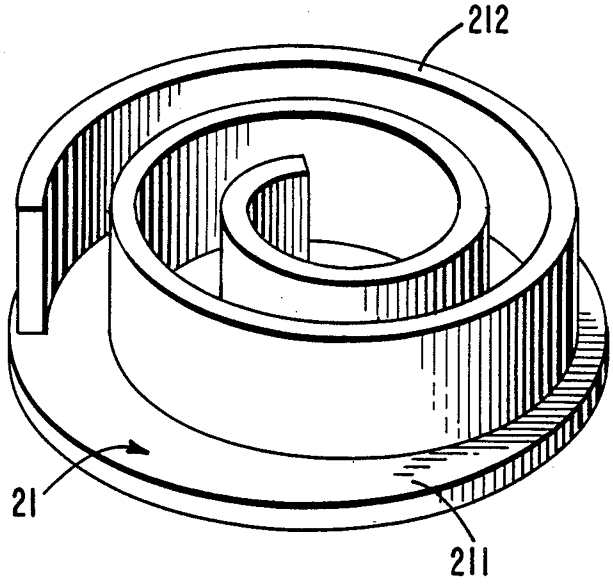
FIG. 2 is an exploded perspective view of a scroll used in the compressor of FIG. 1.

Referring to FIG. 1, a scroll type fluid displacement apparatus in the form of a scroll type refrigerant compressor is shown in accordance with the present invention. The compressor includes compressor housing 10 having front end plate 11 and cup shaped casing 12 fastened on the rear end surface of front end plate 11. An opening 111 is formed in the center of front end plate 11 for penetration or passage of drive shaft 13. An opening in cup shaped casing 12 is covered by front end plate 11, and the mating surface between front end plate 11 and cup shaped casing 12 is sealed by O-ring 14. Front end plate 11 has annular sleeve 15 projecting from the front end surface thereof which surrounds drive shaft 13 and defines a shaft seal cavity.

Drive shaft 13 is rotatably supported by sleeve 15 through bearing 16 located within the front end of sleeve 15. Drive shaft 13 has disk shaped rotor 131 at its inner end which is rotatably supported by front end plate 11 through bearing 17 located within opening 111 of front end plate 11.

An electromagnetic clutch 18, which is disposed around sleeve 15, includes pulley 181 rotatably supported on sleeve 15 through bearing 19, electromagnetic coil 182 disposed within an annular cavity of pulley 181 and armature plate 183 fixed on the outer end of drive shaft 13 which extends from sleeve 15. Drive shaft 13 is connected to and driven by an external power source through electromagnetic clutch 17.

The interior of cup shaped casing 12 is formed by the inner wall of cup shaped casing 12 and the rear end surface of front end plate 11. Fixed scroll 20, orbiting scroll 21, a driving mechanism for the orbiting scroll and rotation preventing/thrust bearing device 22 for orbiting scroll 21 are located within the interior of cup shaped casing 12.

Fixed scroll 20 includes circular end plate 201, a wrap or spiral element 202 affixed to or extending from one side surface of circular end plate 201 and a plurality of internally threaded bosses 203 axially projecting from the other side surface of circular end plate 201. An axial end surface of each boss 203 sits on the inner surface of end plate 121 of cup shaped casing 12 and is fixed to end plate 121 by bolts 23. Thus, fixed scroll 20 is fixed within cup shaped casing 12. Circular end plate 201 of fixed scroll 20 partitions the inner chamber of cup shaped casing 12 into two chambers including discharge chamber 24 having bosses 203 and suction chamber 25 in which spiral element 202 is located. Seal ring 26 is placed between the outer peripheral surface of circular end plate 201 and the inner surface of cup shaped casing 12 to provide sealing therebetween. A hole or discharge port 204 is formed through circular end plate 201 of fixed scroll 20 at a position near the center of spiral element 202. Hole 204 is connected between the central fluid pocket of the spiral elements and discharge chamber 24.

Orbiting scroll 21, which is located in suction chamber 25, includes circular end plate 211 and a wrap or spiral element 212 affixed to or extending from one side surface of end plate 211. Spiral element 212 of orbiting scroll 21 and spiral element 202 interfit at an angular offset of 180° and a predetermined radial offset to make a plurality of line contacts. Therefore, at least one pair of sealed off fluid pockets are defined between spiral elements 202 and 212. Orbiting scroll 21 is connected to a conventional driving mechanism and rotation preventing/thrust bearing device 22 to effect orbital motion of orbiting scroll 21 by rotation of drive shaft 13.

As orbiting scroll 21 orbits, the line contacts between spiral elements 202 and 212 move toward the center of these spiral elements along the spiral curved surface of spiral elements 202 and 212. This causes the fluid pockets to move to the center with a consequent reduction in volume and compression of the fluid in the fluid pockets. The fluid or refrigerant gas, which is introduced from an external fluid circuit through fluid inlet port 27 formed on cup shaped casing 12, is taken into the fluid pockets formed between spiral elements 202 and 212 from the outer end portions of the spiral elements. As orbiting scroll 21 orbits, fluid in the fluid pockets is compressed and the compressed fluid is discharged through discharge hole 204 into discharge chamber 24 from the center fluid pocket of spiral elements 202 and 212. Thereafter, the fluid in discharge chamber 24 is discharged to the external fluid circuit through fluid outlet port 28 formed on cup shaped casing 12.

Figure 3:
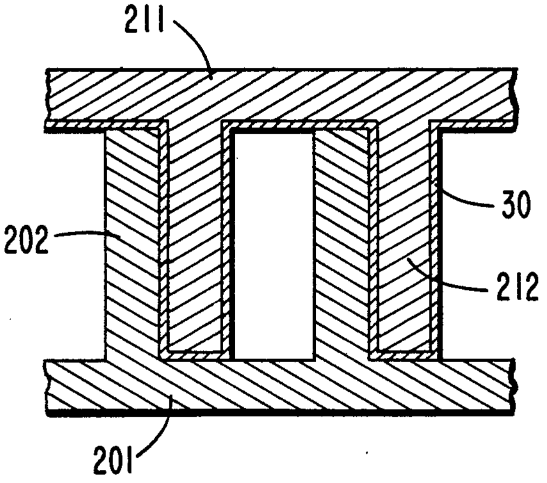
FIG. 3 is a partial sectional view of interfitting scrolls for the compressor of FIG. 1 illustrating the main feature of this invention.

In the above described construction, both scrolls 20 and 21 are made of aluminum or an aluminum alloy by forging, casting or die casting to reduce the weight of the compressor. After forming the scroll, the surfaces of the spiral elements and end plates are finished by end milling, and then the contact portion of the scrolls is electrolytically polished or chemically polished to reduce the roughness of the contact surfaces of the scrolls. An alumite treatment then is applied to the contact surface of spiral element 212 of orbiting scroll 21 to form an oxidizing film 30 as shown in FIG. 3.

The treatment of the surface of spiral element 212 with alumite to form oxidizing film 30 reduces friction between the contact surfaces of spiral elements 202 and 212. Since the surfaces of both scrolls 20 and 21 are protected from wearing due to sliding contact therebetween, the sealing of the fluid pockets during extended use can be maintained. Furthermore, since the roughness of the surface of the scrolls is reduced by polishing before treatment with alumite, the dimensional accuracy of the scrolls can be more easily obtained.

This invention has been described in connection with the preferred embodiment, but this embodiment is merely for example only, and the invention should not be construed as limited thereto. It should be apparent to those skilled in the art that other variations or modifications can be made within the scope of this invention.

I claim:

1. In a scroll type fluid displacement apparatus including fixed and orbiting scrolls formed of aluminum or aluminum alloy, each of said scrolls comprising an end plate and a spiral wrap extending from one side of said end plate, said spiral wraps interfitting at an angular and radial offset to make a plurality of line contacts which define at least one pair of sealed off fluid pockets, driving means operatively connected to said orbiting scroll for orbiting said orbiting scroll relative to said fixed scroll while preventing rotation of said orbiting scroll to thereby change the volume of the fluid pockets, a method for reducing the frictional wear between the contact surfaces of said scrolls, said method comprising the steps of:
   mechanically finishing the contact surface of at least one of said scrolls to provide a smooth surface; and
   treating said smooth surface with alumite,
wherein said step of mechanically finishing the contact surface of at least one of said scrolls to provide a smooth surface is performed by electrolytic polishing.

2. In a scroll type fluid displacement apparatus including fixed and orbiting scrolls formed of aluminum or aluminum alloy, each of said scrolls comprising an end plate and a spiral wrap extending from one side of said end plate, said spiral wraps interfitting at an angular and radial offset to make a plurality of line contacts which define at least one pair of sealed off fluid pockets, driving means operatively connected to said orbiting scroll for orbiting said orbiting scroll relative to said fixed scroll while preventing rotation of said orbiting scroll to thereby change the volume of the fluid pockets, a method for reducing the frictional wear between the contact surfaces of said scrolls, said method comprising the steps of:
   mechanically finishing the contact surface of at least one of said scrolls to provide a smooth surface; and
   treating said smooth surface with alumite,
wherein said step of mechanically finishing the contact surface of at least one of said scrolls to provide a smooth surface is performed by chemical polishing.

* * * * *